(12) United States Patent
Nissen et al.

(10) Patent No.: US 7,913,224 B2
(45) Date of Patent: Mar. 22, 2011

(54) DEVICE FOR THE AUTOMATED GENERATION OF PROGRAM CODE

(75) Inventors: Joerg Nissen, Stockach (DE); Guenter Velten, Stockach (DE)

(73) Assignee: Framework Systems GmbH, Stockach (DE)

( * ) Notice: Subject to any disclaimer, the term of this patent is extended or adjusted under 35 U.S.C. 154(b) by 1064 days.

(21) Appl. No.: 11/620,136

(22) Filed: Jan. 5, 2007

(65) Prior Publication Data

US 2007/0157163 A1 Jul. 5, 2007

(30) Foreign Application Priority Data

Jan. 5, 2006 (DE) .................. 20 2006 000 135 U (51) Int. Cl.
*G06F 9/44* (2006.01)

(52) U.S. Cl. ........ 717/106; 717/110; 717/114; 717/127; 717/131; 717/140

(58) Field of Classification Search .................... 717/106
See application file for complete search history.

(56) References Cited

U.S. PATENT DOCUMENTS

| 5,860,004 | A  | * | 1/1999  | Fowlow et al. | 717/109 |
| 6,604,110 | B1 | * | 8/2003  | Savage et al. | 707/602 |
| 7,761,848 | B1 | * | 7/2010  | Chaffin       | 717/116 |
| 2003/0056195 | A1 | * | 3/2003  | Hunt       | 717/116 |
| 2003/0182457 | A1 | * | 9/2003  | Brewin     | 709/310 |
| 2003/0200532 | A1 | * | 10/2003 | Gensel     | 717/120 |
| 2003/0208743 | A1 | * | 11/2003 | Chong et al. | 717/106 |
| 2003/0233367 | A1 | * | 12/2003 | Uluakar et al. | 707/102 |
| 2005/0257193 | A1 | * | 11/2005 | Falk et al. | 717/109 |

OTHER PUBLICATIONS

Elwahidi et al. "Generating user interface from specifications produced by a reverse engineering process" Computer-Aided Software Engineering, 1995. Proceedings., Seventh International Workshop on, 1995, pp. 296-302.*
Wang, P.S. "Graphical user interfaces and automatic generation of sequential and parallel code for scientific computing" Compcon Spring '88. Thirty-Third IEEE Computer Society International Conference, Digest of Papers. Publication year: 1988, pp. 486-492.*
Exadel Studio Pro 3.0, "Getting Started Guide for Creating a JSF Application", Revised Aug. 8, 2005, Exadel Inc., CA, USA, pp. 1-9.
Smirnov, S., "Exadel Announces JSF Studio", May 3, 2004, The ServerSide.Com, www.theserverside.com, pp. 1-5.

\* cited by examiner

Primary Examiner — Thomas K Pham
(74) Attorney, Agent, or Firm — Leydig, Voit & Mayer, Ltd.

(57) ABSTRACT

A device for automated generation of program code of a user program which can be run on a run unit on a user side is provided. The device includes a editing unit configured for programming access by an operator, a code generator and/or code converter unit and a code memory unit. The code generator and/or code converter unit converts an output signal of the editing unit with respect to data and in automated fashion in such a way that input and/or output data types of the user program are converted to classes and/or methods of a C# programming environment and are stored by the code memory unit in a source code programming database of the code memory unit. A run code generating unit is configured for generating executable program code of the user program and converting contents of the source code program database to the program code of the user program.

12 Claims, 9 Drawing Sheets

Example: C# source code as generated by code generator unit 12
```
public class cdCustomer : Package001_cdCustomer
{
}
/// <summary>
/// Holds all information about a customer
/// </summary>
public class Package001_cdCustomer
{
private string firstName;
/// <summary>
/// First name of a customer.
/// </summary>
public string FirstName
{
get { return firstName; }
set { firstName = value; }
}
private string lastName;
/// <summary>
/// Last name of a customer.
/// </summary>
public string LastName
{
get { return lastName; }
set { lastName = value; }
}
/// <summary>
/// Returns the full name of a customer.
/// </summary>
public virtual string FullName
{
get { return this.FirstName + " " + this.LastName; }
}
}
public class frmCustomer : Form
{
public frmCustomer() { }
/// <summary>
/// The customer object associated with the form
/// </summary>
public cdCustomer oCustomer;
}
```

Fig. 4

Fig. 5 tblRep_Component

| C_ID | C_Version | C_Name | C_N_ID | C_CT_ID | C_Description | Package_ID |
|---|---|---|---|---|---|---|
| 58112 | 1 | cdCustomer | 44218 | 2 | Represents a ... | 001 |
| 58113 | 1 | cdCustomer | 44218 | 2 | Represents a ... | 002 |

(Fig. 7)

tblRep_ComponentProperty

| CP_ID | CP_Vers | CP_Name | CP_C_ID | CP_Read | CP_GetMethod | ... | CP_Labels | Package_ID |
|---|---|---|---|---|---|---|---|---|
| 15442 | 1 | FirstName | 58112 | 0 | | ... | <binary> | 001 |
| 10382 | 1 | LastName | 58112 | 0 | | ... | <binary> | 001 |
| 10043 | 1 | FullName | 58112 | 1 | return this.First... | ... | <binary> | 001 |
| 10044 | 1 | FullName | 58113 | 1 | return this.First... | ... | <binary> | 002 |

Fig. 6

Fig. 7 tblRep_Form

| F_ID | F_Version | F_Name | F_BaseID | F_N_ID | ... |
|---|---|---|---|---|---|
| 71772 | 1 | frmCustomer | | 44218 | |

(Fig. 5)

tblRep_FormVariable

| FVar_ID | FVar_Version | FVar_Name | FVar_F_ID | FVar_DatatypeC_ID | FVar_Description | ... |
|---|---|---|---|---|---|---|
| 4882 | 1 | oCustomer | 71772 | 58112 | ... | | tblRep_Control

| Ctrl_ID | Ctrl_Version | Ctrl_Name | Ctrl_CtrlT_ID | Ctrl_F_ID | Ctrl_Data | ... |
|---|---|---|---|---|---|---|
| 72431 | 1 | edtFirstName | 2 | 71772 | <binary> | |
| 71334 | 1 | lblOfEdtFirstName | 5 | 71772 | <binary> | |
| 26524 | 1 | edtLastName | 2 | 71772 | <binary> | |
| 26688 | 1 | lblOfEdtLastName | 5 | 71772 | <binary> | |
| 45221 | 1 | edtFullName | 2 | 71772 | <binary> | |
| 72323 | 1 | lblOfEdtFullName | 5 | 71772 | <binary> | |

```
public class cdCustomer : Package002_cdCustomer
{
}
public class Package002_cdCustomer : Package002_Link_cdCustomer
{
public override string FullName
{
get { return this.LastName + ", " + this.FirstName; }
}
}
public class Package002_Link_cdCustomer : Package001_cdCustomer
{
}
public class Package001_cdCustomer
{
private string firstName;
public string FirstName
{
get { return firstName; }
set { firstName = value; }
}
private string lastName;
public string LastName
{
get { return lastName; }
set { lastName = value; }
}
public virtual string FullName
{
get { return this.FirstName + " " + this.LastName; }
}
}
public class MyForm : Form
{
public MyForm() { }
/// <summary>
/// The customer object associated with the form
/// </summary>
public cdCustomer oCustomer;
}
```

DEVICE FOR THE AUTOMATED GENERATION OF PROGRAM CODE

Priority is claimed to German Utility Model Application No. DE 20 2006 000 135.2, filed Jan. 5, 2006, the entire disclosure of which is incorporated by reference herein.

The present invention relates to a device for the automated generation of program code of a user program which can be run on a run unit (runtime environment) on the user side.

BACKGROUND

Devices of this kind are universally known from the state of the art, in particular in the form of so-called software development suites, such as are offered for example by the firm Microsoft as integrated development tools for the programming languages Visual Basic or Visual C#, and used by typically specialist software developers.

An essential feature of known devices of this kind is visual assistance of the programming work by the operator, namely the provision of suitable modularly structured objects in the form of control panels, symbolic displays of data, databases or other elements of the user program which allow the programmer to generate masks, forms, reports or the like easily and clearly by simply selecting, moving and linking such objects or elements, whereupon source code is generated in the programming language provided at any given time by the generically known code generator unit from such a visual display generated by the programmer.

In this way not only can the manual programming work for the programmer be reduced, but also attractive designs can be generated within a short development time and with a low error rate.

SUMMARY OF THE INVENTION

However, known devices of this kind support only to a limited extent the development of complex applications built up on repetitive procedures, for example, business process applications, transaction systems or the like, because storing of the objects generated by the editing unit, which is determined by the respective file system, and the limited visual assistance of development processes, already make it necessary for the programmer to produce appreciable code components by manual, line-by-line (and text-based) programming work, and furthermore to suitably combine and connect the code fragments generated by the code generator unit and corresponding to, for example, an input mask, by additional programming work—laboriously. As a result, the programmer as a software developer is of course left with the maximum possible flexibility and variability in (visually assisted) development of the user program, but complex applications cause (disproportionately) high complexity which can only be overcome by particularly experienced programmers as operators of a generic system.

Accordingly, common visually assisted programming environments of the generic kind have up to now been useful only for applications in which, on the basis of largely standardised processes, objects and user interfaces, only minor adjustments needed to be made for a respectively specific user program.

It is an object of the present invention to improve a generic device for generating executable program code of a user program with respect to suitability for complex applications, particularly in the environment of business process modelling and support. In particular, the storing of source code generated by the code generator unit in the programming language applied, is to be optimised with a view to a large but manageable number of code fragments, easy and reliable retrieval and reuse, and/or greater clarity to avoid errors. It is a further or alternate object of the present invention to make system programming and maintenance accessible with the generic device to a wider circle of users than programmers, particularly also less experienced and less specialist programmers.

Other objects and advantages of the invention will appear below.

Protection is claimed for use of the invention for producing user programs as ERP (Enterprise Resource Planning) and/or transaction systems in a business environment, wherein use for simple connection of mobile run (execution) units on the user side (clients) is to be considered particularly preferred.

In a manner which is advantageous according to the invention, the code generator and/or code converter unit converts the output signal of the editing unit with respect to data and in automated fashion to classes or methods of the C# programming environment, wherein these classes or methods are then filed (stored) in a source code programming database which is associated with the code memory unit.

By this measure, first of all, known database technologies can be employed (the use of a SQL database is preferred here, and further preferred is the use of a generic, SQL-capable database layer which cooperates with common engines and applications such as MS SQL or Oracle), in order to file and provide source code in an optimally organised manner which is optimised for performance and particularly suitable for large quantities of (code) data, and for a large number of code fragments, and to keep it ready for subsequent maintenance or revision or for generating the executable program code.

By contrast with the prior art file or file system-based organisation, as a result of the invention, not only can increased quality standards in software production be brought in, the device according to the invention is thus also suitable for complex applications with a large number of source code components to be generated automatically, which up to now could be mastered only with difficulty, so that, particularly in the area of business process applications, a previously unattainable proportion of programming tasks can be assisted by the device (and hence no longer have to be programmed—which is laborious and fraught with errors). In the practical realization of the invention it is expected that up to about 95% or more of the source code for a business application may be assisted or automated by means of the present invention by the action of the editing unit and code generator or code converter units, and with approximately 5% to be realised by manual programming (according to a further preferred embodiment, also made possible by corresponding functionality of the editing unit according to the invention).

Particularly advantageously within the scope of the invention, the C# programming environment is employed because, as a component of the otherwise known net (dot net) environment, not only is this favourable for the realisation of and connection to internet technologies, but also properties inherent in language—particularly the concept of inheritance—afford the favourable possibility of automatically converting objects generated by the programmer (e.g. a mask or a form) with its specific properties to other objects of the same application (i.e. the user program concerned).

According to the invention it is also provided that the run (i.e. executable) code generating unit generates the executable program code from the (source code) contents of the code memory unit (to be more precise, the source code program database of the code memory unit) in such a way that the executable program code—suitably filed in a directory of a web server—is executable using otherwise known technologies and in particular on the basis of an internet protocol (preferably HTTP) can be executed by stationary or mobile-linked clients. In this respect the web server then offers a suitable run-time environment for the executable program code, in a development (and in particular with respect to mobile clients) also by suitable session management or the provision of a serialisation unit with which temporarily separate clients can refresh and continue current user sessions.

In a particularly advantageous manner, XML is also used as a basis for communication between the run unit on the user side (client) and the web server; in this way the user side can therefore not only be logically and syntactically separated from the applications running on the web server (user program), also access for a large number of client platforms is made possible as long as they have XML-based access: within the scope of the invention with particular suitability for portable clients, a viewer set up on the user side according to a development can therefore not only work on the basis of Java and/or HTML, but also include portable systems in the form of PDAs (by means of e.g. ASP.NET for a Microsoft pocket PC environment).

As a result, by the present invention in a surprisingly simple and efficient manner there is provided a system for assisted software provision which increases the potential and efficiency of existing, visually assisted software development platforms with respect to a greatly increased degree of assistance and automation in software provision, in particular for complex, business process-oriented applications, at the same time uses the convenience and reliability of commercial database technology for handling the (mainly automatically) generated code, and realises the advantages of the net environment for effectively assisting mobile applications (or combined mobile and stationary applications).

With the device according to the invention there is provided a system which in a substantially more extensive manner also makes the use of high-performance software development environments accessible to business-oriented and specialist programmers for systems (further) development and maintenance of complex business-oriented applications, without the assistance of specialist programmers being necessary.

BRIEF DESCRIPTION OF THE DRAWINGS

Further advantages, characteristics and details of the invention are apparent from the description below of preferred embodiments and with the aid of the drawings; the latter show.

DETAILED DESCRIPTION

Figure 1:
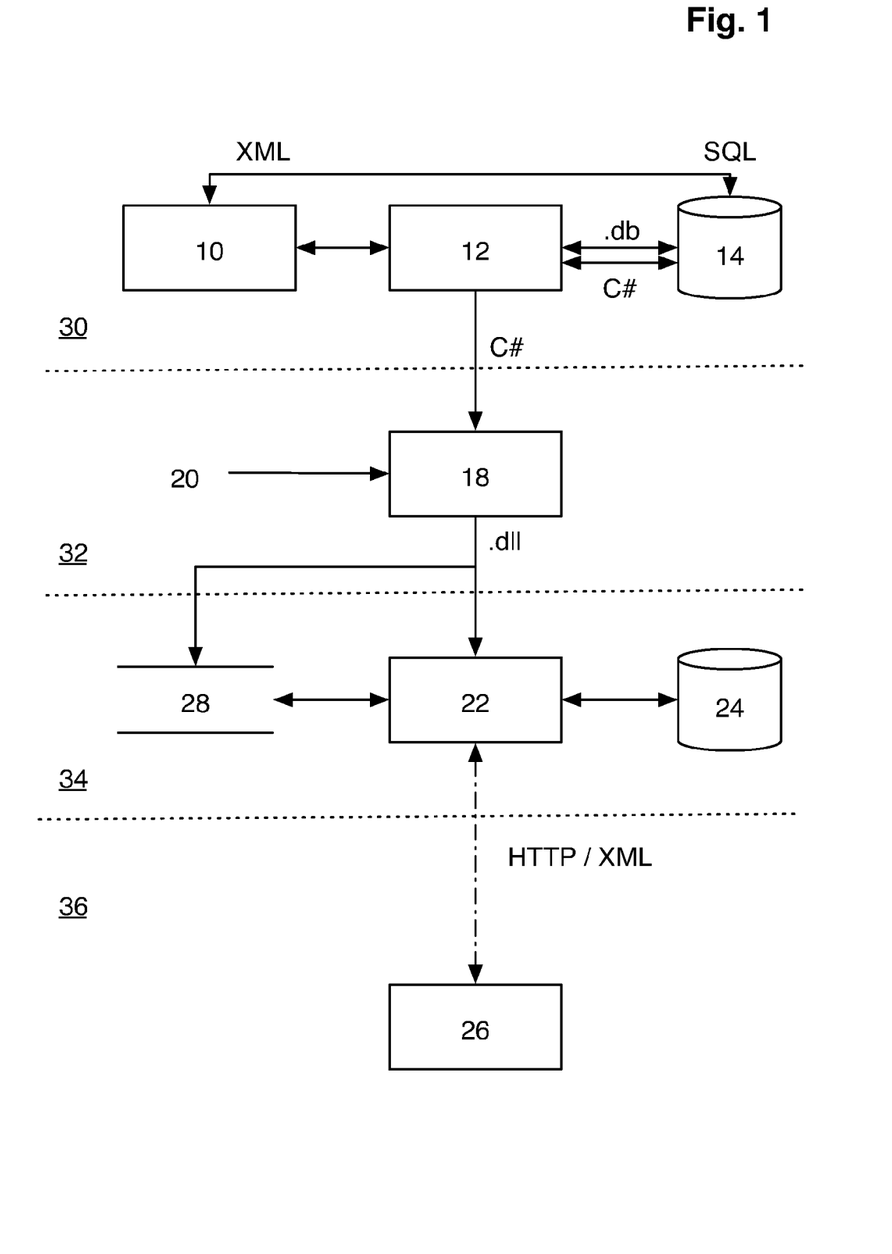
FIG. 1 a schematic block diagram of the device according to the invention for the automated generation of program code of a user program which can be run on a run unit (runtime environment) on the user side, according to a first, preferred embodiment of the invention.

As shown in FIG. 1 schematically by horizontally running broken lines, the embodiment shown can be divided into and understood as different function groups realised by means of one or more data processing devices: thus a first function group 30 is provided for program development, namely by means of an editing unit 10 which can be operated (by a programmer as the operator), a code generator unit 12 associated with and connected to the output of the editing unit 10, and a code memory unit 14 which cooperates with the code generator unit 12 and which is a SQL database for C# source code generated by the unit 12 (and additionally for the visual or symbolic elements, or manually coded code generated with the editing unit 10) and includes a standardised database engine realised by means of a relational database system such as MS SQL or Oracle. As depicted by the arrows, unit 10 communicates with database 14 such that (already created) database content (i.e. C# source code) from the database is presented to the operator who can modify the code in a visually supported manner, resulting in this modified code being re-stored in the database 14 thru unit 12. Symbols ".db" illustrate database commands issued by unit 12 for storage or retrieval access.

Adjacent to the function group 30 in FIG. 1, there is shown, as a function group 32, a run (executable) code generating unit in the form of a compiler unit 18 which is designed to generate executable program code from the C# source code of the database 14 (supplied via code generator unit 12). This generating process is triggered by a schematically shown trigger signal 20 which can be fed automatically or, e.g., by user entry.

Again logically (and usually also physically) separate from the function group 32 is the function group 34 comprising a web server 22, wherein the web server is designed to execute the executable program code (generated by the unit 18) by means of suitable run-time modules and for this purpose accesses the executable program files stored in a schematically shown file system unit 28. The schematically shown database unit 24 illustrates any database functionality as well as data sources of the executable user program, so that the function group arranged in region 34 can be understood as a (web server based) run environment for the finished, executable user program.

On the user side (in region 36), a schematically shown client unit (run unit) 26 for executing the application (user program) now accesses the web server 22, wherein communication takes place on the basis of an internet protocol (e.g. HTTP) and is XML-based, so that the client unit 26 can be realised by means of almost any platform—mobile or stationary.

In the manner thus described, there is therefore provided a flexible development and run system which is also suitable for high-performance business process applications, can be used in mobile fashion and is easily scalable and which combines the requirements of simple and efficient program development with high-performance and reliable running conditions, this being with the maximum possible flexibility in user access. By using web technologies in client communication, suitable security technologies (e.g. SSL or VPN) can also be implemented at the same time without this affecting other function areas of the system.

A typical program development and program execution operation of the device shown schematically in FIG. 1 would be as follows. An operator as the programmer produces, by means of the editing unit 10 and the libraries which are also accessible to him (typically in standardised form), suitable input and/or output masks of the user program to be produced, also required forms, development process displays, data types in the form of variables and further elements or objects such as are necessary for producing a typical business process application.

In a manner according to a development, the editing unit is also suitable for a group of operators, wherein several programmers (operators) can be advantageously and effectively prevented from simultaneously editing the same object (e.g. mask or form).

The code generator unit 12 then converts the objects produced with visual assistance by the unit 10, to C# source code which is filed in the SQL database 14—suitably indexed and more extensively processed with respect to database. To be more precise, not only does the unit 14 generate the code fragments corresponding to respective objects in the form of C# classes and/or methods, the latter are also suitably processed as database entries for the database 14 and filed in the latter.

Subsequent alterations or modifications of this C# source code are then in turn made not directly by editing the database contents, but by (visually assisted) processing in the editor, whereupon in turn the code generator unit 12 generates correspondingly altered C sharp code for the database 14.

Whereas the overwhelming majority of the programming work to be carried out by the programmer by means of the editing unit 10 is assisted visually or with respect to objects by existing patterns or models, the editing unit affords the additional possibility of creating additional methods after the fashion of a traditional text- or line-based program code editor, wherein these methods are then entered directly in the database 14 by means of the unit 12.

Figure 2:
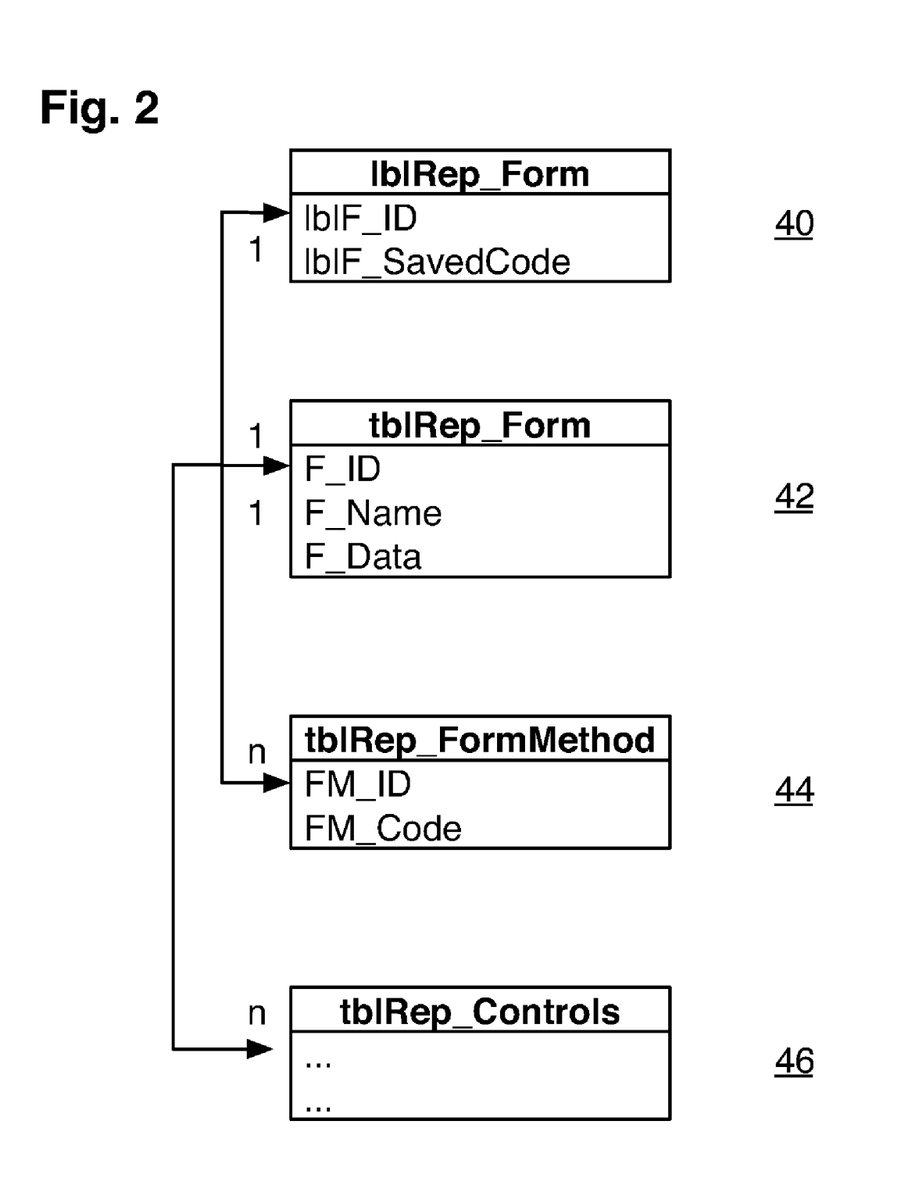
FIG. 2 a schematic block diagram for illustrating logical relational database structures for database filing of form data in the code memory unit as in FIG. 1.

FIG. 2 illustrates in a highly simplified and abstract form a relational database structure for database-based filing in the code memory unit 14; in the example of FIG. 2, form data and program code relating thereto are stored in the form of the schematically shown database table 40 to 46, wherein corresponding tables and relational table links are provided analogously for further objects (for example, reports, component, metadata types and workflows, etc.).

The reports generated by the editing unit 10 with visual assistance are on the one hand entered in the database unit 14 by direct access to the unit 14 (for non-C# program code) and by means of the unit 12 (for C# source code generated thereby), according to the table structure shown in FIG. 2. To be more precise, a central table 42 (tblRep_Form) covers a description of the respective form in the data field F_Name, also associated property data (in the field F_Data), and provides an index data field (F_ID) for relational linking to further tables; thus this index is linked by a 1:n link to the table 44 which, for an associated index field, stores C# source code entered by a user (as methods) in the data field FM_Code. The C# source code generated by the action of the unit 12 is filed in a table 40 (data field lblF_SavedCode), linked by a 1:1 relation to the index of the table 42. Schematically, FIG. 2 also shows a further table 46 (tblRep_Controls) which, in turn linked by 1:n to the table 42, contains data on control elements of respective forms. The drawing of FIG. 2 is here to be understood as purely schematic, greatly reduced and only as an example of forms (as a category of many other possible elements); with respect to numerous other elements with associated C# source code and comprehensive applications to be supported for database purposes within the scope of the present invention, the data memory unit 14 here constitutes a high-performance database application which is then suitably carried out at systems level by correspondingly high-performance, otherwise known engines (in the present example MS SQL).

The triggering of a control signal 20 then activates the run code (executable code) generating unit 18 which first fully assembles from the database 14 the C# source code relevant to the desired user program, and then converts it to a executable form like a (generally known) compiler, in the practical embodiment generates MSIL or .DLL files therefrom, which can then be executed directly in a suitable run-time environment. The result of the run-generating unit is stored in the file system 28 which is associated with the web server 22.

Execution of the user program then takes place by access on the user side 26 to the web server 22, the executable program code then being executed on the latter. By using XML communication between client 26 and web server 22, the configuration generated thus becomes multi-platform-capable; the use of common web technologies also allows suitable security configurations as well as the suitable provision of mobile and/or stationary client access.

In more detail, and with reference to FIGS. 3 thru 8, a software development process will be explained that employs the device as depicted in FIGS. 1, 2 for realizing a simple application as in the screenshot of FIG. 4, essentially consisting of an input mask for two input data fields "FirstName", and "LastName", and which produces an output display "FullName" combining entries into the two fields for an output field.

Creating the application by means of the present embodiment of the invention begins by defining a component, in essence the logic piece of the object to be created: With reference to the source code example of FIG. 3, and by means of the visual editing tool (reference numeral 10 in FIG. 1) the developer creates a component as a C#-class, this component being provided with three properties, namely, FirstName, LastName and FullName. In the corresponding C#-source code (FIG. 3) it becomes obvious that for the properties "FirstName" and "LastName", the software code calls up the "get" methods as provided for by the C#-syntax, and for the FullName property, a combination of these two string valuables is generated for later display.

Figure 3:
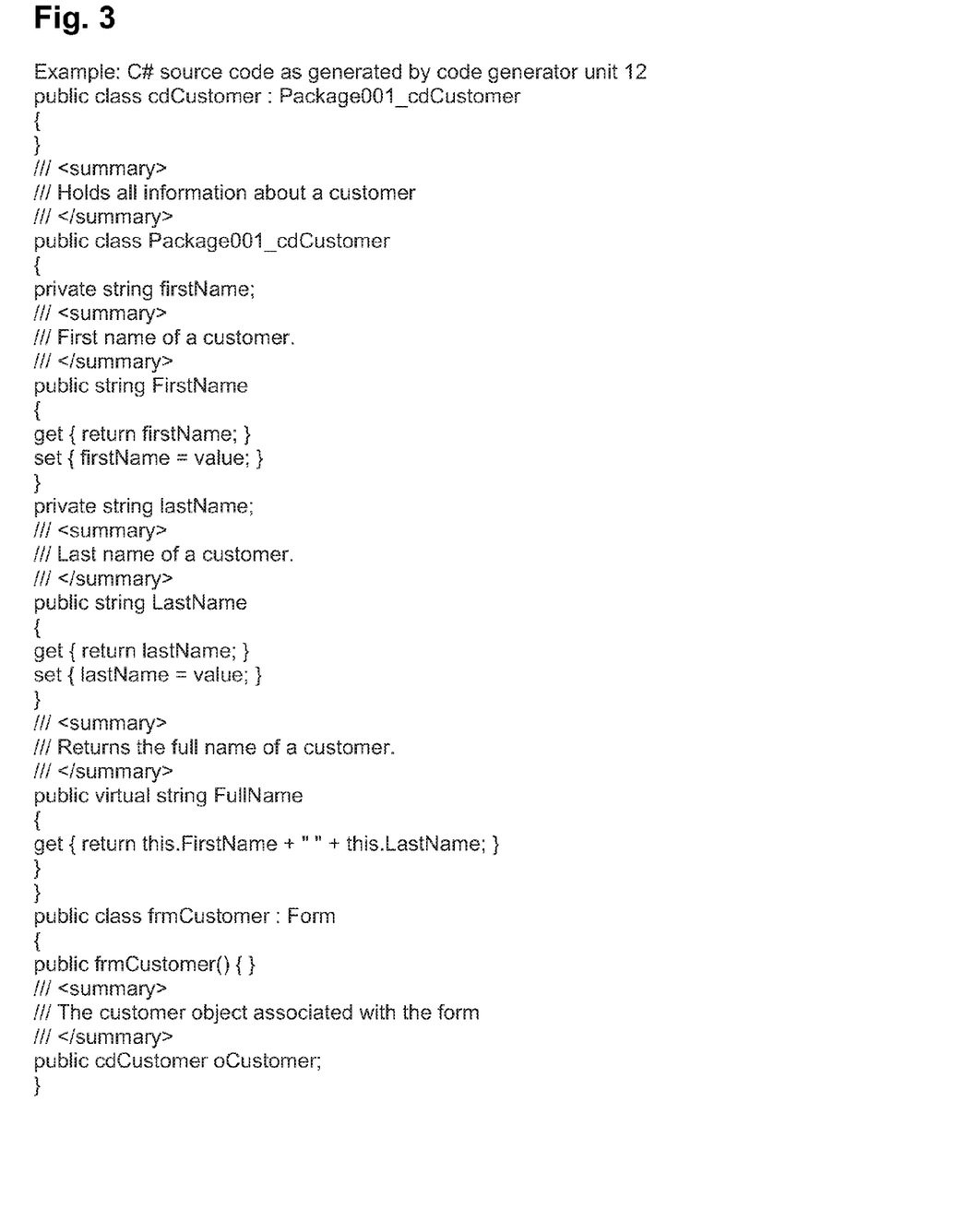
FIG. 3 sample C# source code generated by the code generator unit of FIG. 1 for demonstrating the creating of a simple application by means of the device of FIG. 1.
Figure 5:
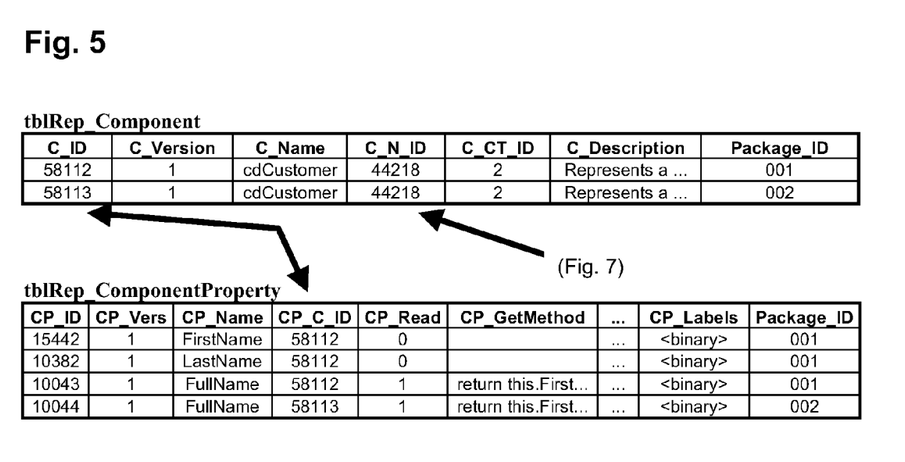
FIG. 5 component table entries into two relational database tables employed for the example application of FIG. 3, FIG. 4.

In accordance the invention, however, the system does not merely produce the source code as in FIG. 3, but also produces database entries for the component, and for the three properties thereof (FIG. 5). More particularly, and following the general concept of a table-based relational database, in this example, a component table "tblRep_Component" is being entered with the component generated above, labelled "cdCustomer", and receiving a unique ID (field "C ID"). A further table for storing component properties "tblRep_ComponentProperty" receives three entries for the three above properties of "cdCustomer", these entries linked to "cdCustomer" by means of the "ID" (58112 in the example).

This is a major distinction over the prior art (the closest of which is assumed to be a regular visually supported C#-programming environment, e.g. Microsoft Visual Studio): While, based on visually supported editing work, the prior art technology would simply generate the C#-source code as given in the enclosed example file, and then store the same with a typical file extension (e.g. .cs) in a corresponding directory, the system of the present invention produces a table-based database system as explained. The big advantage thereof is that, thereby, the data are filed in a table structure, not simply as C#-source. In addition, however, C#-source is also generated and stored, see below.

If, for example, a property needs to be re-named, there is no need to analyse the body text of the (comprehensive) source code; rather, only the corresponding entries into the database tables will have to be modified. Also, the given structure of the database is such that is corresponds to the way that software designers (for object oriented software) think and work in terms of component+property+label.

Figure 6:
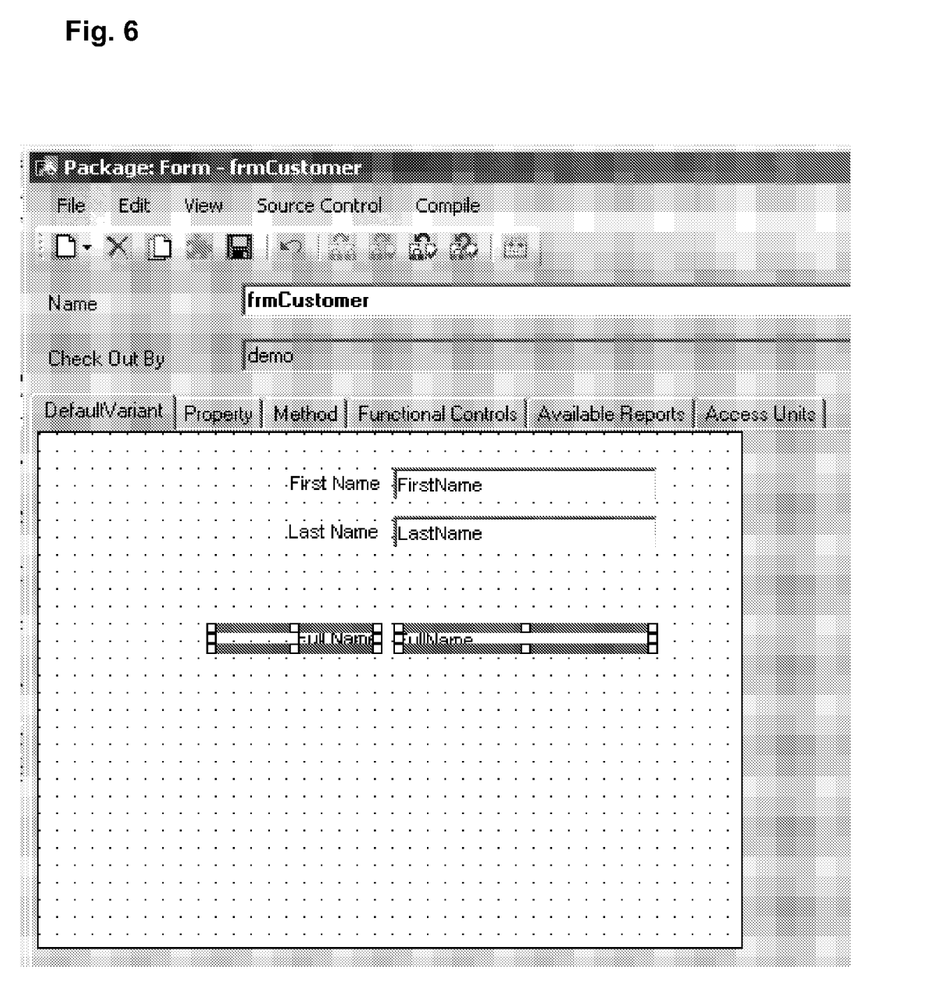
FIG. 6 operation of the visual editing unit of FIG. 1 shown in a screenshot manner.
Figure 7:
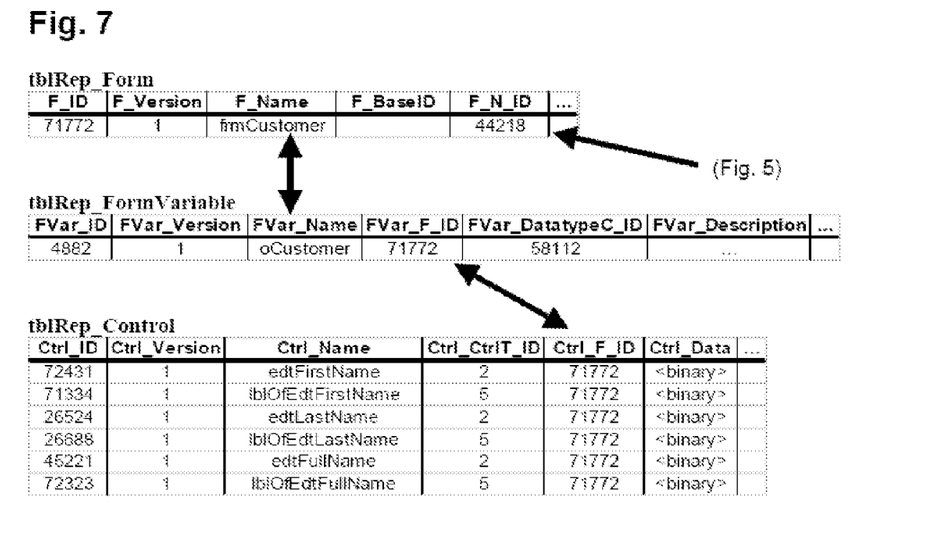
FIG. 7 forms and controls related table entries into three further relational database tables employed for the example application of FIG. 3 thru FIG. 6.
Figure 8:
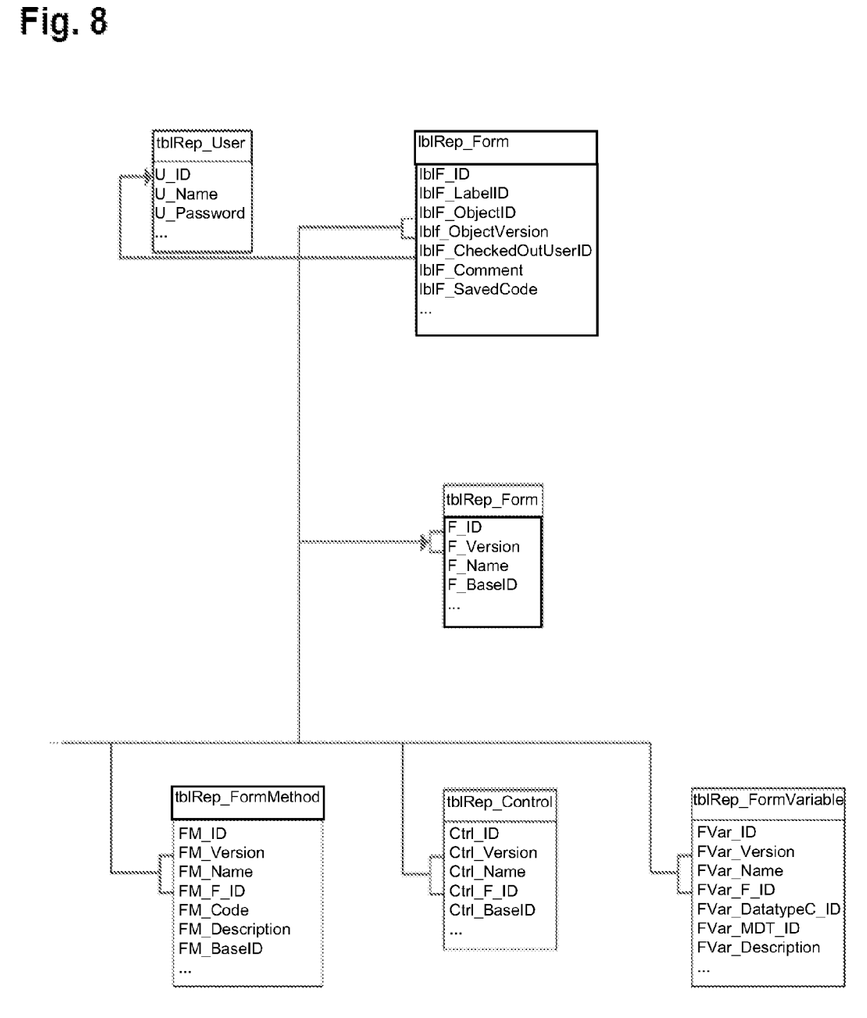
FIG. 8 a further schematic block diagram for illustrating the logical database structure and links among the database tables of FIG. 7.

With reference to FIG. 6 to 8, it will now be explained how, building on the component above, a form is being created to realize the visual expression. Once again, a visually supported editing unit is used to generate the layout of the form to be created, and the system will generate a C#-source code therefrom, as well as appropriate database entries into forms-related tables (in the enclosed source code example of FIG. 3, at the bottom thereof, the source code has been drastically abbreviated, in essence by resorting to an existing class "Form" from which the class "FormCustomer" has been derived through inheritance). It will be noted that a corresponding entry is made to the table "tblRep_Form" (FIG. 7), and that, in order to create an instance of the above component "cdCustomer" for this form (in essence for linking the component to the form, the component can be perceived as a property of the form), an entry "oCustomer" is made into table "tblReg_FormVariable", corresponding to the instance of "cdCustomer" which has been created (cf. also the very bottom of the C#-source code example of FIG. 3).

Additional form elements that have been created by means of the visual editor 10 are being entered into corresponding entries of table "tblRep_Control".

The illustration of FIG. 8 illustrates the forms-related tables used in this simple implementation example: Table "tblRep_Form" in the middle of the illustration receives one entry for each form, which in turn is linked to the three bottom tables for possible additional methods (which were not used in this example), the controls and the properties, in this case, being the instance of "cdCustomer" as "oCustomer" (FIG. 7).

In addition, the database structure features a user table (tblRep_User) and a version table labelled "lblRep_Form". The former captures different users of the system which may be working on objects of the system (i.e. which have checked out respective code), while the version table not only tracks various versions of a specific object (e.g. of form "formCustomer") but also includes a database field for the respective C#-code (database field "lblF_SavedCode").

Linking the above to FIG. 1, editor 10 allows for the visual generation and manipulation of the software application to be designed, interacting with code-generation unit 12 which, on the one hand, produces database entries into the SQL database 14 (symbolized as .db), but which also produces C#-source code to be stored in "lblRep_Form" as discussed above. Once a new executable version is to be produced, unit 18 receives C# source code from database 14 via unit 12 and generates an executable therefrom in a usual compiling fashion (leading to e.g. a .dll file).

With regard to FIGS. 5 to 11, in the following, a further modification and embodiment of the present invention will be described. More particularly, it will be described how modifications to the example as depicted in FIG. 4 will not result in major alterations of the generated source code, rather, only a change of database entries will become necessary.

Figure 4:
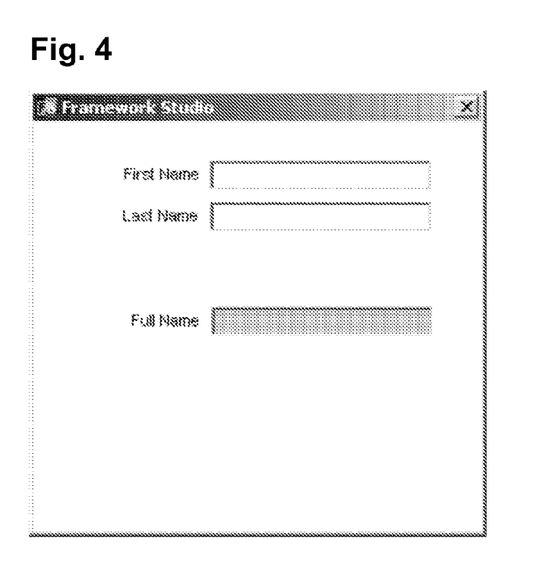
FIG. 4 the resulting output from executing the source code of FIG. 3 shown in a screenshot manner.

As a modification to the example of FIG. 4 (and with further reference to the original C# source code of FIG. 3) it shall be assumed that, for adapting the example to a different country, the output "FullName" shall be modified such that the combined string, in contrast to the original version, begins with the LastName string, followed by FirstName (i.e. a reversal in arrangement).

A developer may carry out this task by resorting to the visual editor (unit 10 in FIG. 1), or may amend the code manually.

Figure 9:
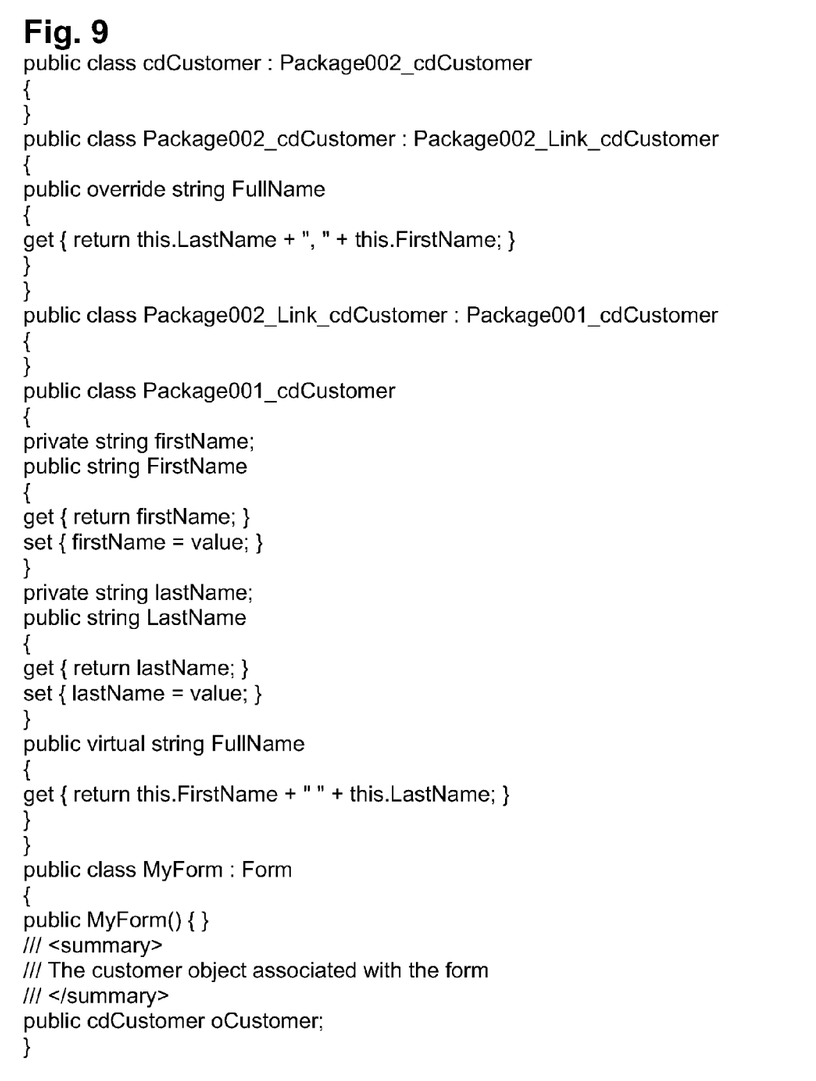
FIG. 9 a modified version of the sample C# source code of FIG. 3, explaining modification to the application example by overriding the "get" method of FIG. 3.

FIG. 9, directly corresponding to FIG. 3, explains the necessary changes. It becomes obvious that, before associating the class cdCustomer to the pre-existing Package001_cdCustomer, first, connection is built to an intermediate class Package002_cdCustomer. In more detail, and as it becomes obvious from the code lines at the top of FIG. 9, the "get" method is modified to the desired new sequence, i.e. LastName before FirstName, overriding the string variable FullName of the subsequent class Package001_cdCustomer. Thus, this class essentially remains unchanged, and the modification thereof being realized by means of an overriding command logically corresponds to an additional layer above the original source code.

In the database tables of FIG. 5, this modification generates additional table entries, in the respective bottom lines of the tables shown: In tblRep_Component, and corresponding to (right column) Package_ID 002, this additional code portion is being captured, the modified "get" method being entered in the bottom line entry of tblRep_ComponentProperty, carrying the same Package_ID 002.

Figure 10:
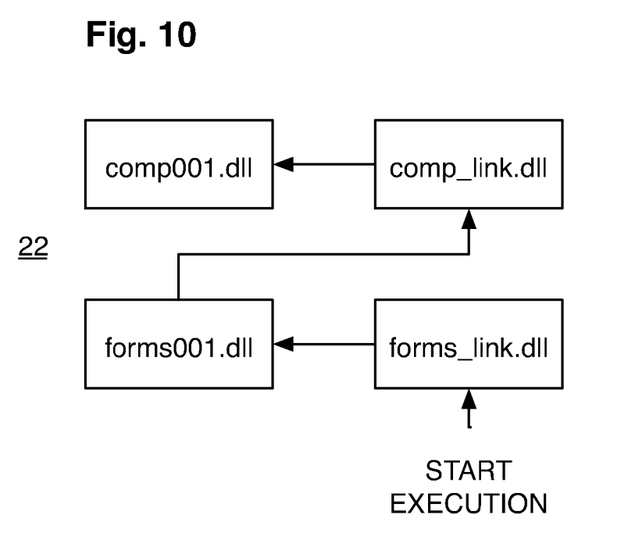
FIG. 10 a schematic block diagram illustrating executable files on the runtime level, and an execution sequence thereof, in the example of FIG. 3, FIG. 4.
Figure 11:
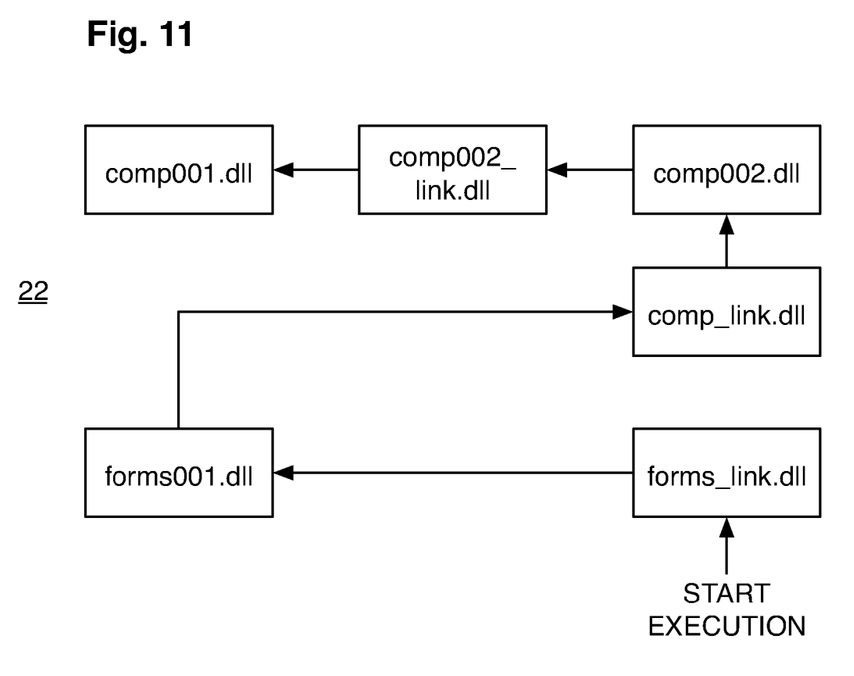
FIG. 11 a schematic block diagram corresponding to FIG. 10, additionally including the modification of FIG. 9 as logical intermediate layer executable file.

With regard to FIGS. 10, 11, illustrating the respective executable components for execution by web server 22, this change becomes visible as follows:

FIG. 10, corresponding to the un-modified application example of FIG. 4, in essence employing the source code of FIG. 3 properly entered into the database tables of FIGS. 5, 7 (without the bottom level entries of Package_ID 002), and as a result of compiling as performed by compiling unit 18 (FIG. 1), an executable file forms_link.dll, essentially providing a link to the subsequent forms001.dll executable, is being called up for execution by the web server 22 (.dll executable files being stored in unit 28). Forms001.dll, in return, calls up a link class comp_link.dll, this class in return calling up executable component class comp001.dll.

The code modification discussed above in connection with FIG. 9, and with reference to FIG. 11, will now lead to an additional executable, comp002.dll (plus link class comp002_link.dll), which is called up by comp_link.dll (and which, in return, calls up comp001.dll), and which provides for the overriding of the "get" method as explained in connection with FIG. 9. On the runtime level of FIG. 10, FIG. 11, this will lead to an additional executable file in the form of comp002.dll, facilitating overall compiling and execution functions, and serving as a virtual intermediate layer at this execution level to represent the modifications carried out to the original system.

As it becomes obvious from the modified code of FIG. 9, intelligent use of the inheritance function, in connection with the advantageous database structure, permits creation of highly complex application systems in a well-ordered, controlled manner, providing for flexible roll-back, and access to original code (FIG. 8, tblRep_form) if desired.

It should also be appreciated that the present detailed description of the invention is given in terms of preferred embodiments of the invention, and that various modification of steps, parts and the like would be readily apparent to a person of skill in the art, and that such modifications are considered to fall within the broad scope of the present invention.

We claim:

1. A device for automated generation of program code of a user program which can be run on a run unit on a user side, the device comprising:
    an editing unit configured for programming access by an operator and configured for a visually assisted selection and/or design of input and/or output masks, forms, development process displays, data types and/or data memory units of the user program;
    associated with the editing unit a code generator and/or code converter unit and a code memory unit associated with the latter,
    wherein the editing unit, the code generator and/or code converter unit as well as the code memory unit are function elements of a data processing device configured for program development, in particular within the framework of a software development environment,
    wherein the code generator and/or code converter unit converts an output signal of the editing unit with respect to data and in automated fashion in such a way that said input and/or output masks, forms, development process displays, data types and/or data memory units of the user program are converted to classes and/or methods of a C# programming environment and are stored by the code memory unit as C# classes and/or C# methods for database purposes in a source code programming database of the code memory unit; and
    a run code generating unit configured for generating executable program code of the user program and associated with the code memory unit in such a way that in reaction to a request signal, the run code generating unit converts contents of the source code program database to the program code of the user program which is to be provided on the user side by a web server by means of an internet-capable protocol and which preferably can be run in a user-specific manner.

2. The device according to claim 1, wherein the internet-capable protocol is http.

3. The device according to claim 1, wherein, for access to the editing unit, connected to the input of the latter is an XML-based viewer unit for the operator.

4. The device according to claim 1, wherein the program code which can be run in a user-specific manner is XML-based and/or allows XML-based communication between the run unit on the user side and the web server.

5. The device according to claim 1, wherein the run unit on the user side is a portable or stationary data processing device which has a Java-based, ASP.NET, .net or html-based viewer.

6. The device according to claim 1, wherein the source code program database is constructed based on SQL independently of database type, and designed to cooperate with a standardised database environment, in particular a MS SQL server and/or an Oracle database engine.

7. The device according to claim 1, wherein the editing unit is designed for insertion or manual entry of additional C# program code.

8. The device according to claim 1, wherein the editing unit is configured such that properties or elements selected or designed as part of an input or output mask, a form or a process display, in particular a graphic control element, are automatically converted by an inheritance property of the C# programming language to logically and/or dependently related properties or elements of further input and/or output masks, forms or process displays.

9. The device according to claim 1, wherein the editing unit is configured for visually assisted entry of process steps of a development process, in particular adjustment, database access or decision steps, wherein predetermined graphic symbols associated with these steps can be arranged in a sequence corresponding to the development process in relation to each other on a two-dimensional representational level of the editing unit, connected with each other, and associated process step parameters can be assigned to respective process steps.

10. The device according to claim 1, wherein the editing unit comprises means for control of access by several operators, which are configured such that access to an input or output mask, a form, a development process display, a data type and/or a data memory unit of the user program by a respective one of the several operators at a relevant moment is possible exclusively for the respective operator.

11. The device according to claim 1, wherein, upon a modification of the C# classes and/or C# methods stored in the source code programming database, additional database entries are generated that reflect the modification, and that are employed by the run code generating unit for generating the executable program code.

12. The device according to claim 11, wherein the source code programming database permits an exchange of the C# classes and/or C# methods stored therein with updated C# classes and/or C# methods, so as to enable the run code generating unit to employ the additional database entries unchanged with the updated C# classes and/or C# methods.

* * * * *